(12) United States Patent
Kilinc et al.

(10) Patent No.: US 11,677,513 B2
(45) Date of Patent: Jun. 13, 2023

(54) RETRANSMISSION FOR PUNCTURED SIGNALS

(71) Applicant: TELEFONAKTIEBOLAGET LM ERICSSON (PUBL), Stockholm (SE)

(72) Inventors: Caner Kilinc, Luleå (SE); Sara Sandberg, Luleå (SE); Mattias Andersson, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 16/479,093

(22) PCT Filed: Dec. 21, 2017

(86) PCT No.: PCT/IB2017/058240
§ 371 (c)(1),
(2) Date: Jul. 18, 2019

(87) PCT Pub. No.: WO2018/142201
PCT Pub. Date: Aug. 9, 2018

(65) Prior Publication Data
US 2019/0379491 A1 Dec. 12, 2019

Related U.S. Application Data

(60) Provisional application No. 62/455,296, filed on Feb. 6, 2017.

(51) Int. Cl.
*H04L 1/18* (2023.01)
*H04L 1/1829* (2023.01)
*H04L 1/1867* (2023.01)
(52) U.S. Cl.
CPC ............ *H04L 1/1858* (2013.01); *H04L 1/189* (2013.01); *H04L 1/1864* (2013.01); *H04L 1/1896* (2013.01)

(58) Field of Classification Search
CPC ..... H04L 1/189; H04L 1/1896; H04L 1/1864; H04L 1/1835
See application file for complete search history.

(56) References Cited

U.S. PATENT DOCUMENTS 9,106,418 B2    8/2015 Yoo
2009/0323792 A1* 12/2009 Zhou ..................... H04L 1/0019
                                                        375/224

(Continued)

FOREIGN PATENT DOCUMENTS

WO    2013134948 A1    9/2013

OTHER PUBLICATIONS

Convida Wireless, "Discussion on eMBB and URLLC Mixing," 3GPP TSG RAN WG1 AH_NR Meeting, R1-1701139; Spokane, Washington, USA, Jan. 16-20, 2017, 4 pages.

(Continued)

*Primary Examiner* — Omer S Mian
(74) *Attorney, Agent, or Firm* — Christopher & Weisberg, P.A.

(57) ABSTRACT

A radio node is configured for use in a wireless communication system. The radio node in this regard is configured to transmit a signal that is punctured by another signal to another radio node. The radio node is also configured to estimate a probability of decoding failure that characterizes a likelihood that the another radio will fail to decode the punctured signal. The radio node is further configured to retransmit at least a punctured portion of the punctured signal if the estimated probability is above a threshold.

11 Claims, 13 Drawing Sheets

(56) References Cited

U.S. PATENT DOCUMENTS

| | | |
|---|---|---|
| 2013/0044797 A1 | 2/2013 | Nammi |
| 2018/0070341 A1* | 3/2018 | Islam .................... H04L 1/1887 |
| 2019/0222362 A1* | 7/2019 | Beale .................... H04L 5/0064 |
| 2019/0319750 A1* | 10/2019 | Khosravirad ......... H04L 1/0061 |
| 2020/0195486 A1* | 6/2020 | Atungsiri ................ H04B 7/02 |

OTHER PUBLICATIONS

Huawei et al., "On DL multiplexing of URLLC and eMBB transmissions," 3GPP TSG RAN WG1 AH_NR Meeting, R1-1700022; Spokane, Washington, USA, Jan. 16-20, 2017, 12 pages.

Sequans Communication, "On dynamic resource sharing between URLLC and eMBB in DL," 3GPP TSG RAN WG1 AH_NR Meeting, R1-1700642; Spokane, Washington, USA, Jan. 16-20, 2017, 6 pages.

NTT Docomo Inc., "On multiplexing of eMBB and URLLC in downlink," 3GPP TSG RAN WG1 AH_NR Meeting, R1-1700626; Spokane, Washington, USA, Jan. 16-20, 2017, 8 pages.

Fujitsu, "Preemption based Multiplexing eMBB and URLL," 3GPP TSG RAN WG1 AH_NR Meeting, R1-1700659; Spokane, Washington, USA, Jan. 16-20, 2017, 8 pages.

* cited by examiner

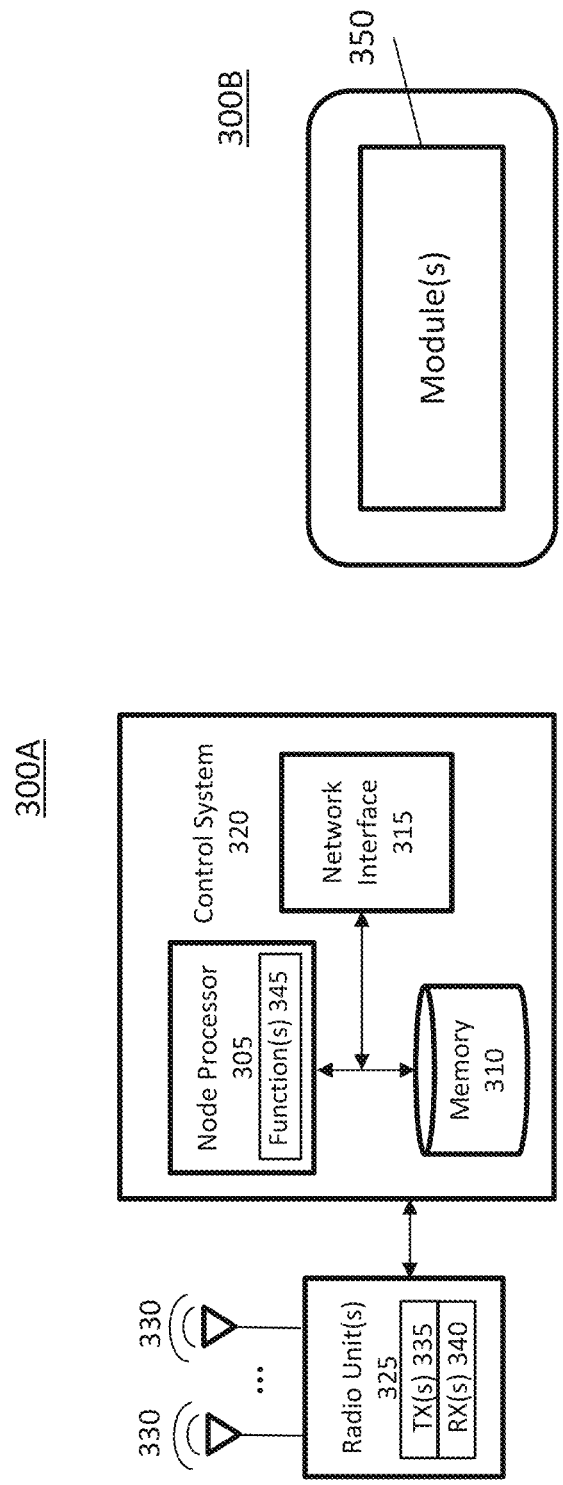

RETRANSMISSION FOR PUNCTURED SIGNALS

RELATED APPLICATIONS

This application is a 371 of International Application No. PCT/IB2017/058240, filed Dec. 21, 2017, which claims the priority and benefit of U.S. Patent Application 62/455,296, filed Feb. 6, 2017, entitled "HARQ Retransmission for Punctured EMBB", the disclosures of which are fully incorporated herein by reference.

TECHNICAL FIELD

The disclosed subject matter relates generally to telecommunications. Certain embodiments relate more particularly to telecommunications devices and methods for sending and decoding punctured signals.

BACKGROUND

A wide range of data services are being studied for use in 5G by 3GPP researchers including, e.g., enhanced Mobile Broadband (eMBB) and Ultra-Reliable Low Latency Communication (URLLC). URLLC is a new data service with extremely strict error and latency requirements as described by "Overview of URLLC," Ericsson, R2-1700393 (uploaded Jan. 6, 2017).

To enable optimization for different services, the length of the TTI is expected to vary. For instance, URLLC may have a shorter TTI length than eMBB. URLLC data transmission is supposed to happen, while the eMBB transmission may be occurring, as soon as a URLLC data packet arrives to the transmitter. It may therefore be desirable to puncture (interrupt) the eMBB transmission in certain time-frequency resources and perform a URLLC transmission on those resources. This comes with the drawback that the receiver of the (partial) eMBB will with high probability not be able to decode successfully. This may be solved by performing HARQ re-transmissions, but since the information in the soft-buffer is partly corrupt (for the resource where the first transmission was punctured) a large number of HARQ re-transmissions may be required for correct decoding.

In many wireless communications systems, HARQ (Hybrid Automatic Repeat Request) re-transmissions is a method to handle un-predictable interference and channel variations. The LTE HARQ mechanism consists of multiple stop-and-wait protocols that can be applied in parallel to allow continuous transmission of data. In LTE, there is one HARQ entity per terminal and per component carrier. HARQ processes belong to the same HARQ entity, but have independent HARQ acknowledgements. The TTI (subframe) has 1 ms duration and the HARQ-ACK, for FDD, is transmitted in subframe n+4 for a data transmission in subframe n. In LTE uplink, the HARQ retransmission timing is fixed, and the HARQ retransmission process typically takes 8 ms for each retransmission.

For downlink, when a receiver has attempted to decode a data message it transmits an indicator to the transmitter indicating whether the decoding was successful or not. When the transmitter receives an indicator indicating unsuccessful decoding the transmitter typically performs a re-transmission of the data message which the receiver most likely will combine with the original received transmission. When a retransmission is needed, the retransmission may use a different set of coded bits than the previous transmission as in incremental redundancy (IR) HARQ, which includes Chase combining (CC) as a special case. This combining is known as soft combining where Chase and incremental redundancy are two well-known variants. The combining will greatly increase the probability of successful decoding as described by 3GPP TS.36.321.

With IR, each retransmission may be different to the previous transmission, but all retransmissions represent the same information bits. The receiver combines the soft information of the first transmission with the soft information of the retransmission. If exactly the same coded bits are used for the first transmission and the retransmission, i.e. Chase combining, the combined soft information corresponds to a codeword with the same length as the first transmission. If any bits that were not part of the first transmission are included in the retransmission, the combined soft information corresponds to a longer codeword with lower code rate.

When using soft combining, the erroneously received packet is stored in a buffer memory, a soft buffer, and it is later combined with one or several retransmissions. The decoder is operating on the combined soft buffer, thereby producing a more reliable output than if only a single transmission would have been used.

However, when a punctured transmission is received in uplink or downlink, successful decoding is unlikely because of the corrupted bits. A retransmission is requested by the receiver by sending NACK HARQ response to the transmitter. When the transmitter receives the NACK feedback, another redundancy version corresponding to the same information is transmitted. However, the new soft information is combined with the soft information in the buffer, also for the corrupted punctured bits, and decoding will likely fail.

SUMMARY

In certain embodiments of the disclosed subject matter, a transmitter transmits a signal that is punctured by another signal. When puncturing the signal, the transmitter can directly estimate the probability that the receiver will not be able to decode the transmitted signal. If the probability is above a predetermined or adaptive threshold, the transmitter retransmits at least the punctured portion of the punctured signal. The retransmission can be done before a retransmission request/NACK response is received from the receiver. Moreover, the transmitter may retransmit only a corrupted part of the punctured signal rather than retransmitting an entire subframe of data. In one embodiment, the punctured signal is a signal carrying eMBB data and the another signal is a signal carrying URLLC data.

In certain embodiments, the retransmission of punctured bits over an uplink may be handled differently than a retransmission over a downlink. For example, when retransmitting over an uplink, e.g., from a wireless device, the retransmission of the corrupted part of the eMBB data can be performed in accordance with two alternative embodiments. According to one embodiment, when a radio access node (e.g., eNodeB or gNodeB), determines that the received eMBB data is punctured, it schedules UL resources for the wireless device to allow retransmission only of the corrupted eMBB data, rather than scheduling resources for retransmission of the whole eMBB transmission. When the wireless device receives the retransmission scheduling grant, it may retransmit only the part of the eMBB data that it punctured in the initial transmission.

According to an alternative embodiment, if semi-statically scheduled UL resources are available for the wireless device to perform grant free UL transmissions, the wireless device may retransmit the corrupted punctured data using pre-scheduled UL resources (i.e., a grant free UL retransmission) as soon as such resources become available. This may be performed substantially immediately after the first eMBB transmission, if the wireless device determines that the probability that the radio access node will not be able to decode successfully due to puncturing is high, e.g., above a threshold.

When retransmitting corrupted punctured eMBB data over a downlink, retransmission of the corrupted punctured eMBB data may be performed directly after a punctured transmission as well, e.g., if the radio access node estimates that the wireless device will not be able to decode the data successfully. Moreover, if the radio access node has already retransmitted the eMBB data, it may ignore the first NACK received from the UE. Furthermore, according to certain embodiments, when retransmitting over a downlink, the radio access node may be required to transmit the entire eMBB transmission when, for example, the eMBB and URLLC transmissions were scheduled to different wireless devices and the wireless device receiving the eMBB data has no way of mapping a partial retransmission to the correct bits. In other embodiments, however, a partial retransmission may suffice where, for example, a downlink preemption indication is transmitted using a group common DCI in PDCCH.

Group-common (GC) DCI, or GC-PDCCH, is similar to ordinary DCI. In addition to configuring UEs with a CORE-SET to monitor DCI, UEs can be configured with a CORE-SET to monitor group-common signaling. The group-common DCI carries information on dynamic slot format, preemption indication or SRS switching and power control.

In one embodiment, the group common DCI enables any wireless device monitoring the group common DCI to keep track of puncturing by URLLC transmissions intended for other wireless devices. Given this preemption indication, the radio access node may retransmit only a corrupted portion of the eMBB transmission.

In an uplink, both an radio access node and a wireless device may have access to information about the exact bits of the eMBB data that has been punctured. This information may be used by the radio access node to partially clear the soft information in the soft buffer.

According to an alternative embodiment, the transmitter omits the probability of decoding failure estimation and instead assumes that decoding failure will occur. Accordingly, in this embodiment, at least the corrupted part of the signal is always retransmitted anytime puncturing is done.

According to another embodiment, a radio node receives the signal that is punctured by another signal from the transmitting radio node. The receiver detects that the received signal is punctured and ignores soft information corresponding to the punctured bits in a decoding process. To facilitate ignoring the soft information corresponding to the punctured bits, control signaling (e.g., a preemption indication signaled within a group common DCI) sent by the transmitting radio node may indicate to the receiving radio node information about which portion of the punctured signal is punctured. Ignoring the soft information may include setting LLR values corresponding to the ignored soft information to zero.

In certain embodiments, the receiving radio node also determines that the transmitting radio node will likely retransmit at least a punctured portion of the punctured signal and, based on the determining, refrains from transmitting a NACK to the transmitting radio node as part of a HARQ process.

Still other embodiments comprise systems that include one or more of the radio nodes summarized above, including one or more radio access nodes and one or more wireless devices. Yet other embodiments comprise computer program products and computer-readable media storing computer program products, where the computer program products comprise program instructions for execution by a processor of a radio node, such that the radio node is thereby operative to carry out one or more of the methods summarized above or variants thereof, as detailed further, below.

Certain embodiments of the disclosed embodiments may provide potential benefits compared to conventional techniques and technologies. For example, an amount of resources needed for HARQ retransmission may be significantly reduced by retransmitting only the corrupted part of the eMBB data when receiving a NACK (or in anticipation of a NACK) rather than retransmitting an entire eMBB subframe of data. This benefit may be particularly applicable to an uplink. Furthermore, in a downlink (or in an uplink, when grant-free transmissions are possible), retransmission delay may be reduced significantly due to the transmitter retransmitting corrupted punctured data without waiting for the NACK. In addition, decoding is more likely to succeed when the radio access node can determine the exact bits that have been punctured and thereby partially clear the corresponding soft information in the soft buffer.

BRIEF DESCRIPTION OF THE DRAWINGS

The drawings illustrate selected embodiments of the disclosed subject matter. In the drawings, like reference labels denote like features.

FIG. 3A illustrates a radio access node according to an embodiment of the disclosed subject matter.

FIG. 3B illustrates a radio access node according to another embodiment of the disclosed subject matter.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

Particular embodiments of the invention are described with reference to uplink transmissions. However, certain embodiments are also applicable to downlink transmissions. Moreover, although embodiments of the invention as presented herein is being applicable to a case where a first transmission is punctured, they can equally well be applied to a case where it is a retransmission that is punctured. Furthermore, although embodiments are described with reference to specific nodes, such as UEs and eNodeBs (eNBs), and specific types of signals that are punctured or puncturing, other types of nodes and other types of signals may be used. For example, any suitable wireless end device capable of operation in a radio access network, whether owned by and/or assigned to a particular user or not, may be used instead of a UE. Moreover, any suitable radio access node, such as a base station or gNodeB (gNB) may be used instead of an eNB. Furthermore, any signal having a lower latency requirement than another signal may be used instead of URLLC signals and eMBB signals as the puncturing and punctured signals, respectively.

I. Uplink Retransmission of Corrupted Punctured eMBB Data

Figure 5:
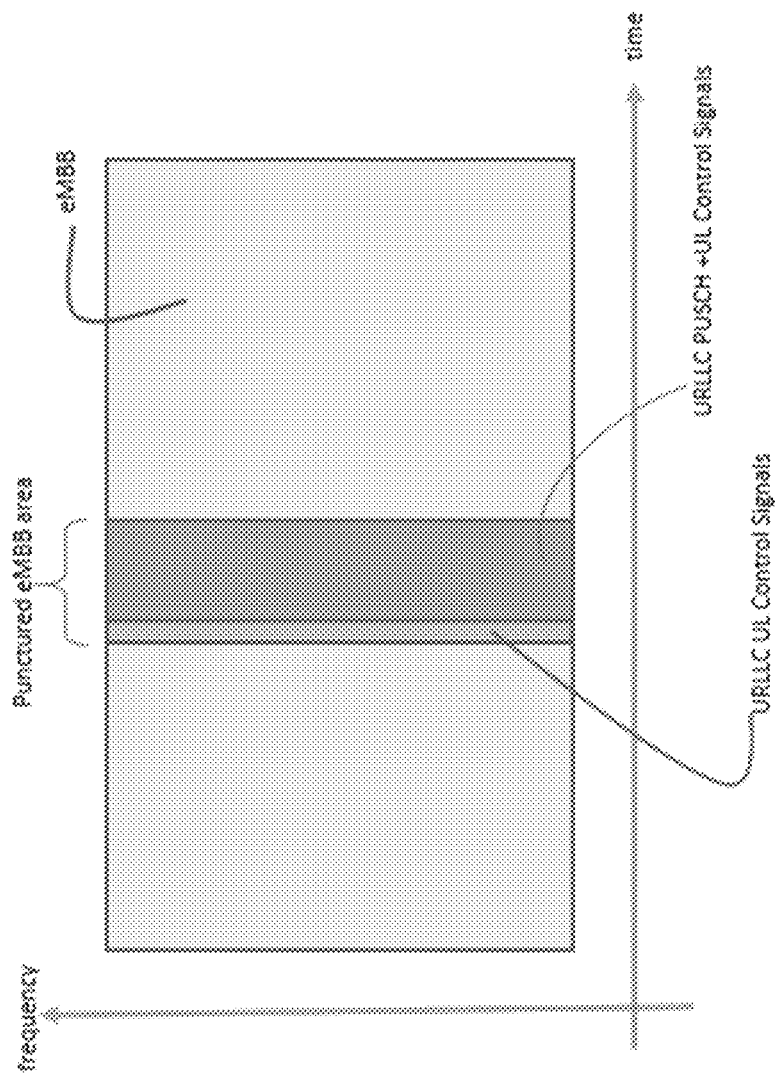
FIG. 5 illustrates an eMBB data signal punctured by a URLLC signal in an uplink.

When a wireless device (also referred to herein as a UE for brevity) transmits eMBB data in uplink, the data may be punctured by URLLC data transmitted in the resources scheduled for eMBB, as illustrated in FIG. 5. When the UE punctures the eMBB transmission it may also store information about which bits of the eMBB transmission that were punctured. This could for example be a range of bits defined through the first bit and the last bit of the punctured range.

In one embodiment, the UE estimates the probability that the eMBB data cannot be successfully decoded by a radio access node (also referred to herein as an eNodeB or eNB for brevity), due to the puncturing. The estimation may be performed substantially immediately after the first transmission. An example procedure for estimating the probability is described further below. If the probability of decoding failure due to puncturing is above a specified threshold, the UE retransmits the punctured part of the eMBB data as soon as possible. The UE may perform the retransmission of the corrupted punctured part of eMBB data in one of two alternative ways:

1) The UE receives a grant with UL resources from eNB (or a NACK on PHICH), or 2) the UE utilizes pre-scheduled uplink resources.

When the eNB receives the punctured eMBB data, which is illustrated in FIG. 5, it determines that the received data is punctured as soon as it detects and decodes the URLLC UL control signals. The eNB sets the log-likelihood ratio (LLR) values of the punctured eMBB bits to zero before starting the decoding process. This is possible for uplink transmissions, since it can be assumed that the same eNB will receive both the eMBB transmission and the URLLC transmission.

Figure 6:
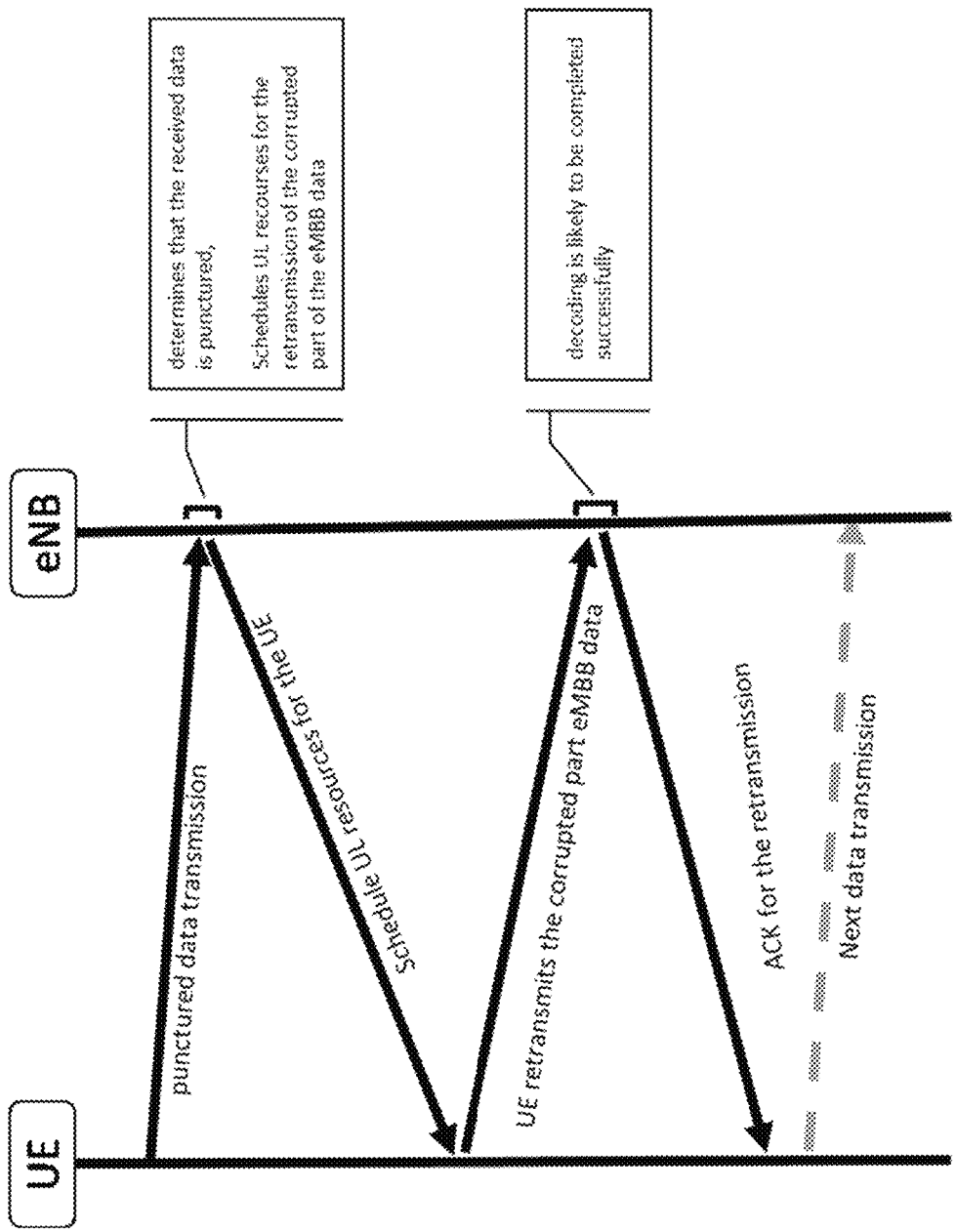
FIG. 6 illustrates a signal timing diagram between a wireless device and a network node in which the network node schedules UL resources only for retransmission of corrupted punctured eMBB bits.

If there are no pre-scheduled uplink resources available (i.e., alternative 1 above) for the UE that sent the eMBB and URLLC, the eNB transmits a NACK on PHICH and schedules uplink resources to allow the UE to retransmit the corrupted part of the eMBB data as illustrated in FIG. 6. When the UE receives the scheduling grant, information indicating that the UE is only expected to retransmit the punctured bits may be included in the grant. Another alternative is to avoid any additional signaling and instead predefine that the UE is expected to transmit only punctured bits if it has punctured the first eMBB transmission and the scheduling grant only contains enough resources to retransmit the punctured bits. The eNB does not have to transmit a NACK on PHICH. As an alternative it can transmit an ACK, or even not transmit a PHICH at all. If the scheduled resources allow, instead of only transmitting punctured bits, the UE could transmit the punctured bits, as well as previously untransmitted bits.

In addition, there are two HARQ retransmission types in LTE UL, adaptive and non-adaptive. In non-adaptive HARQ, only NACK feedback is transmitted to the UE and if NACK received, the retransmission occurs in a predefined fixed time with the same scheduling information as for the previous transmission. However, the size of the first transmission will be larger compared to the retransmission where only the corrupted part of eMBB data is included. In the adaptive HARQ, MCS and RB's may change as per resources allocated by the eNB on PDCCH DCI0 transmission. In this case, the adaptive HARQ solution in NR would be preferable.

Figure 7:
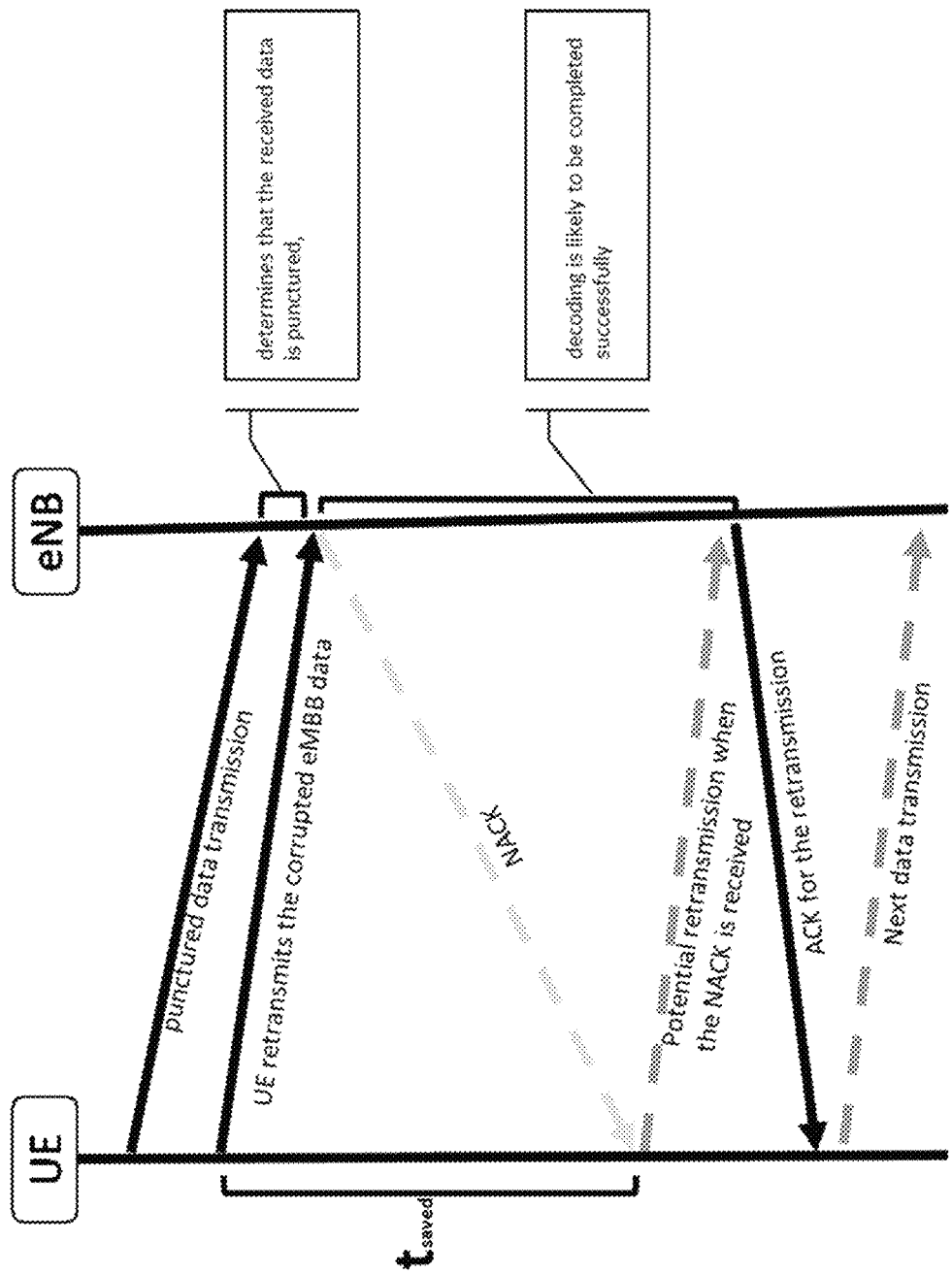
FIG. 7 illustrates a signal timing diagram between a wireless device and a network node in which an UL HARQ retransmission is made without NACK where semi-statically scheduled UL resources are utilized to retransmit data in a punctured eMBB signal.

If there are pre-scheduled uplink resources available (i.e., alternative 2 above) for the UE that sent the eMBB and URLLC, the eNB waits to receive the UE's retransmission of the corrupted part of eMBB data instead of sending a NACK and transmitting a scheduling grant for the retransmission. An example signal timing diagram is shown in FIG. 7. At this point, the UE's ID is known to the eNB and the eNB knows whether there are any semi-statically scheduled UL resources available for the UE to perform grant free UL transmissions. Note that in FIG. 7, as an alternative embodiment, the eNB could transmit the ACK for the retransmission earlier. One reason the embodiment depicted in FIG. 7 may be preferred, however, is that the ACK comes in the same subframe as an ACK for the HARQ process for the original transmission.

If the UE can perform grant free uplink transmissions, the UE uses the pre-scheduled resources to retransmit the corrupted part of the eMBB data, as soon as there are pre-scheduled resources available right after the first eMBB transmission. In this way, the latency of the eMBB transmission is reduced significantly. Optionally, the UE can transmit previously untransmitted bits, as well as the corrupted part of the punctured transmission.

In both of alternatives 1 and 2, when the eNB receives the retransmission it combines information available in the soft buffer (with LLR=0 for all punctured bits) with the soft information of the retransmission. The soft information now corresponds only to the eMBB codeword without punctured URLLC data and decoding is likely to be completed successfully.

II. Downlink Retransmission of Corrupted Punctured eMBB Data

Figure 8:
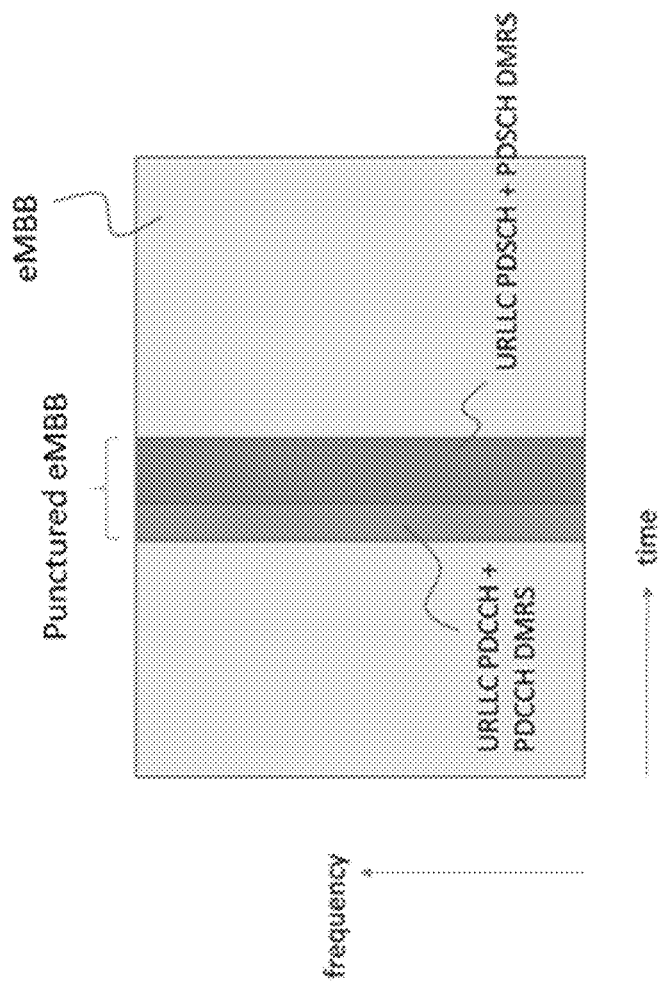
FIG. 8 illustrates an eMBB data signal punctured by a URLLC signal in a downlink.

The URLLC transmission includes a control information part comprising DMRS (DeModulation Reference Signals) for demodulation of the control information as well as control information, and a data part comprising DMRS for demodulation of data as well as data. FIG. 8 illustrates a scenario where the eMBB data transmission is punctured by URLLC data in downlink.

For downlink transmissions, the retransmission of punctured eMBB data may, in certain embodiments, be performed differently depending on if it is the same UE that is the receiver of both eMBB and URLLC or if it is two different UEs that are receivers. According to some embodiments, however, the retransmission of eMBB data is performed the same way but information about which bits were punctured may not be as readily available when two different UEs receive the eMBB and URLLC transmissions.

a. The Same UE Receives Both eMBB and URLLC

When the same UE receives both eMBB and URLLC, it may be configured to attempt to detect the DMRS for the URLLC PDCCH within the eMBB transmission. This configuration may be by means of an RRC (Radio Resource Control) information message configuring the device to detect that puncturing is occurring if a specific reference signal is detected (in this case URLLC PDCCH DMRS). Based on the time-frequency location of the URLLC PDCCH DMRS and the decoded URLLC PDCCH, the UE may determine exactly which bits in the eMBB data transmission that were punctured. As in the uplink case with pre-scheduled uplink resources, the UE may set the LLR values of the punctured bits to zero before decoding. If the probability of decoding failure, calculated as described further below, is above a threshold, the UE may wait for the eNB's retransmission of the punctured eMBB bits instead of sending a NACK. As an alternative, the UE may send a NACK as usual.

On the eNB side, the eNB may estimate the probability of decoding failure directly after puncturing of eMBB data. If the estimated probability is above a threshold, the eNB may retransmit the punctured eMBB bits. Alternatively, the eNB may forgo the probability estimate and assume that the UE will be unable to decode the eMBB transmission and retransmit the punctured eMBB bits. This may be the case when, for example, more than a threshold number of bits are punctured such that a decoding failure is practically unavoidable. In either case, the eNB may retransmit the punctured eMBB bits without waiting until a NACK is received from the UE. In one embodiment, only the punctured eMBB bits are transmitted, since the UE has information from decoding of the URLLC PDCCH about which bits the retransmission corresponds to. As an alternative, the eNB may transmit previously untransmitted bits as well as the bits punctured from the URLLC transmission.

Figure 9:
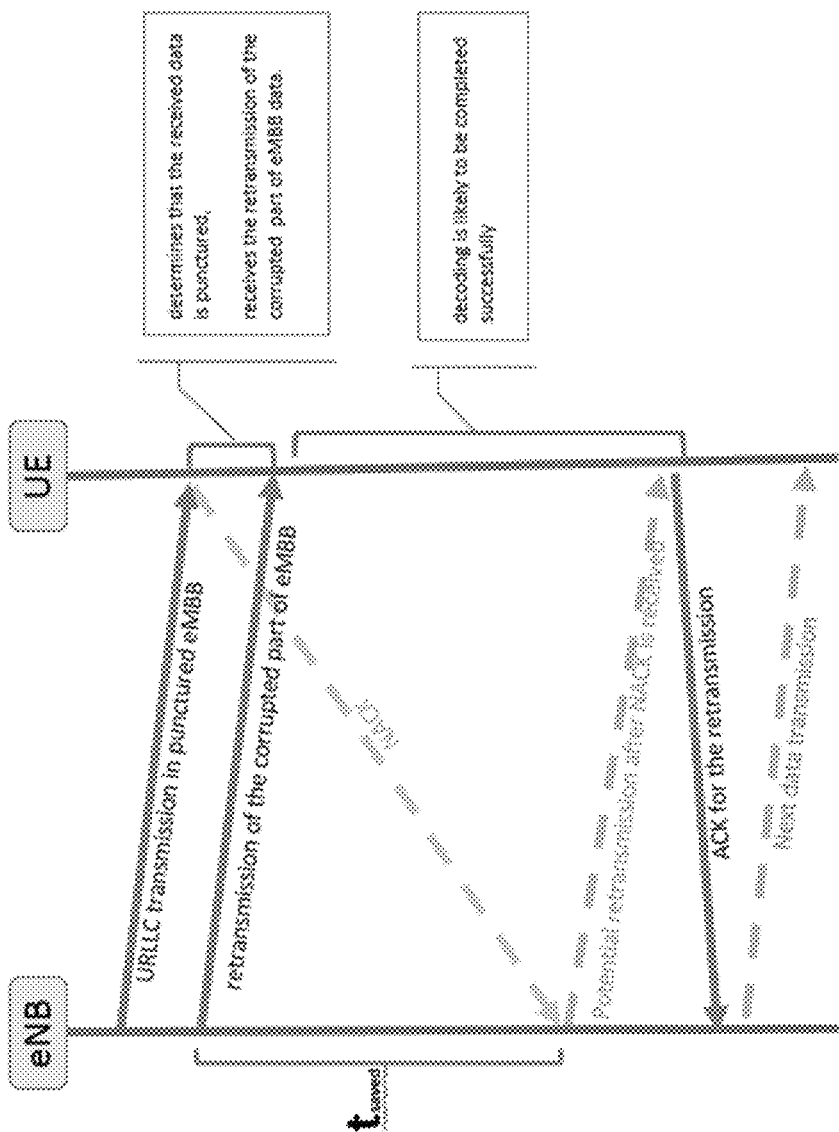
FIG. 9 illustrates a signal timing diagram between a wireless device and a network node in which a DL HARQ retransmission is made without NACK.

When the retransmission is received by the UE, the UE may combine the information in the soft buffer (where LLR values of punctured bits are already zero) with the soft information of the retransmission. The soft information now corresponds to a codeword without punctured bits and decoding is likely to be completed successfully, as shown in FIG. 9. As indicated in FIG. 9, the retransmission delay may be significantly reduced. Moreover, as in FIG. 7, the ACK for the retransmission can be sent earlier in an alternative embodiment.

b. One UE Receives eMBB and Another UE Receives URLLC

Figure 10:
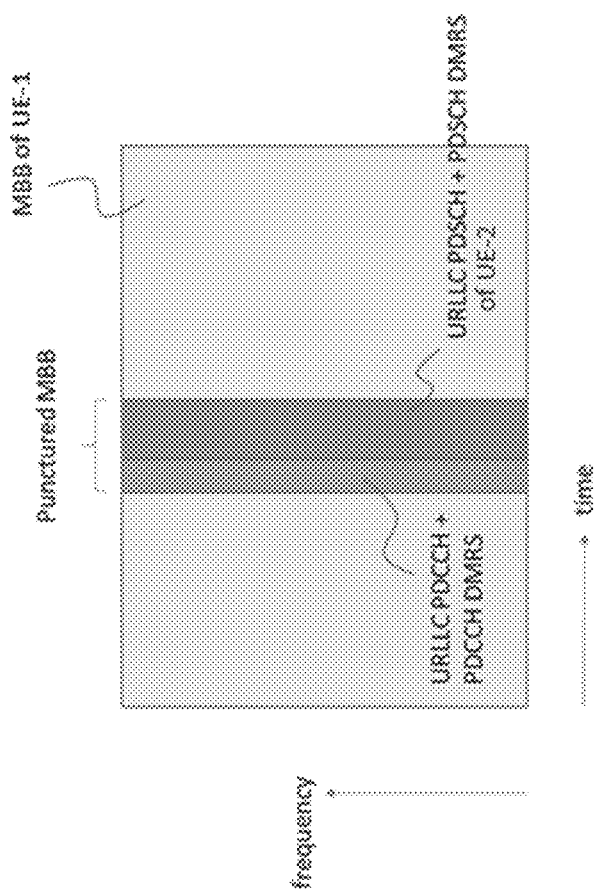
FIG. 10 illustrates an eMBB data signal punctured by a URLLC signal in a downlink where the URLLC signal is addressed to a different wireless device than the eMBB data signal.

The most likely case is that the eNB schedules eMBB data for one UE (UE-1) and URLLC data for another UE (UE-2), as shown in FIG. 10. In this case, UE-1 interprets the punctured bits as ordinary eMBB data, since it has no information about the puncturing. The UE cannot either set the LLR values of the punctured bits to zero, since it doesn't know that puncturing has occurred. It is therefore unlikely that decoding of the eMBB data will be successful.

Thus, the transmitting eNB can estimate the probability of decoding failure as explained further below. If the probability is above a threshold, the eNB may retransmit the whole eMBB data block as soon as possible. This retransmission can contain signaling that tells UE-1 that it should discard the last received transmission, clear the soft buffer, and use the retransmission instead.

Retransmission of only the punctured bits, or a mixture of punctured and not punctured bits, is also a possibility. For example, the retransmission may be accompanied by appropriate signaling that describes exactly which bits in the soft buffer that the retransmitted bits correspond to. After the retransmission, the eNB will receive a NACK from UE-1 that should be discarded. Alternatively, a preemption indication may be signaled with a group common DCI, which enables any wireless device monitoring the group common DCI to be informed of puncturing by URLLC transmissions intended for other wireless devices. The preemption indication may also indicate which bits are punctured. Accordingly, UE-1 can monitor for and receive the preemption indication and thereby detect which bits correspond to the punctured bits and thereby suffice with a retransmission of only a portion of the eMBB data block that contains the punctured bits. The monitoring of the group common DCI introduces some delay, however, in receiving and acting on the puncturing information relative to the case in which the same UE receives both the eMBB and the URLLC data.

III. Estimating the Probability of Decoding Failure

The transmitter, whether it be a UE or an eNB, may estimate the probability that the receiver cannot decode the punctured eMBB data. The probability of decoding failure may depend on or be function of one or more different decoding factors including, e.g., a code block size of the eMBB data before encoding, and/or the code rate and the fraction of codeword bits that are punctured. It may also depend on the signal-to-noise ratio of the transmission and/or the modulation scheme used. For example, in one embodiment the probability of decoding failure may be determined by a look up table indexed according to the one or more decoding factors. In another embodiment, the probability may depend on a formula that depends on one or more decoding factors. In yet further embodiments, a combination of a table and formula may be implemented.

Typically, the fraction of punctured data that may still allow successful decoding is very small, in the order of only a few punctured bits per codeword to a few percent of punctured bits. If the receiver knows exactly which bits are corrupted and sets the log-likelihood ratio (LLR) values of these bits to zero, the probability of successful decoding increases. Setting the LLR values to zero is equivalent to the case where no soft information is available for these bits.

IV. Example Implementations in a Wireless Communication System

The described embodiments may be implemented in any appropriate type of communication system supporting any suitable communication standards and using any suitable components. As one example, certain embodiments may be implemented in a communication system such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 1:
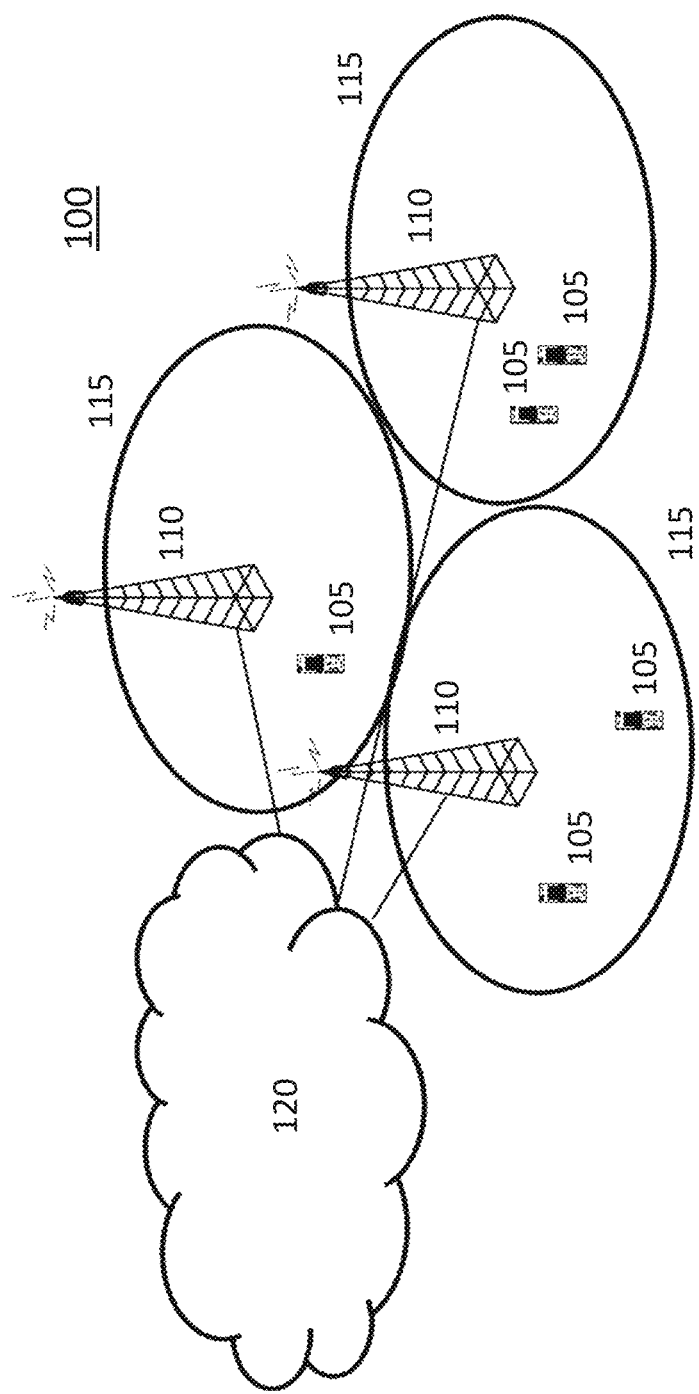
FIG. 1 illustrates communication system according to an embodiment of the disclosed subject matter.

Referring to FIG. 1, a communication system 100 comprises a plurality of wireless communication devices 105 (e.g., UEs, machine type communication [MTC]/machine-to-machine [M2M] UEs) and a plurality of radio access nodes 110 (e.g., eNodeBs, gNodeBs, or other base stations). The wireless devices 105 and radio access nodes 110 may be collectively referred to herein as radio nodes. Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2A:
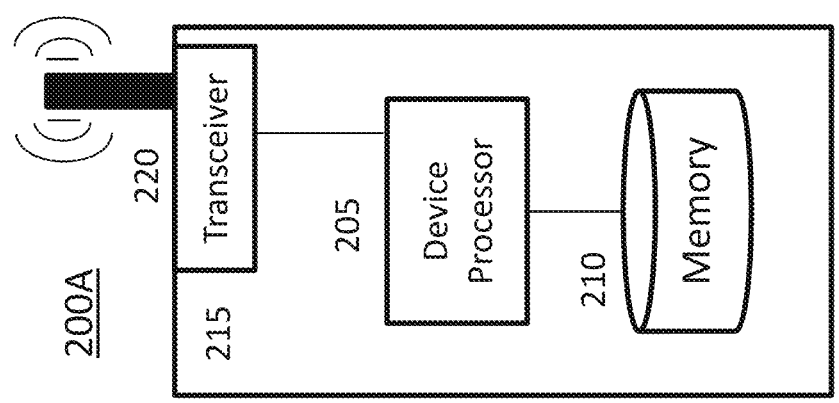
FIG. 2A illustrates a wireless communication device according to an embodiment of the disclosed subject matter.
Figure 2B:
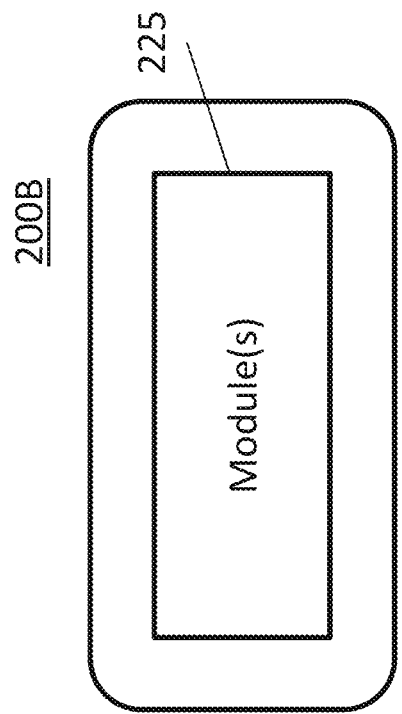
FIG. 2B illustrates a wireless communication device according to another embodiment of the disclosed subject matter.

Although wireless communication devices 105 may represent communication devices that include any suitable combination of hardware and/or software, these wireless communication devices may, in certain embodiments, represent devices such as those illustrated in greater detail by FIGS. 2A and 2B. Similarly, although the illustrated radio access node may represent network nodes that include any suitable combination of hardware and/or software, these nodes may, in particular embodiments, represent devices such as those illustrated in greater detail by FIGS. 3A, 3B and 4.

Referring to FIG. 2A, a wireless communication device 200A comprises a processor 205 (e.g., Central Processing Units [CPUs], Application Specific Integrated Circuits [ASICs], Field Programmable Gate Arrays [FPGAs], and/or the like), a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as memory 210. Alternative embodiments may include additional components beyond those shown in FIG. 2A that may be responsible for providing certain aspects of the device's functionality, including any of the functionality described herein.

Referring to FIG. 2B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 2A.

Referring to FIG. 3A, a radio access node 300A comprises a control system 320 that comprises a node processor 305 (e.g., Central Processing Units (CPUs), Application Specific Integrated Circuits (ASICs), Field Programmable Gate Arrays (FPGAs), and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some or all of the functionality described as being provided by a base station, a node B, an eNodeB, a gNodeB, and/or any other type of radio network access node may be provided by node processor 305 executing instructions stored on a computer-readable medium, such as memory 310 shown in FIG. 3A. Alternative embodiments of radio access node 300 may comprise additional components to provide additional functionality, such as the functionality described herein and/or related supporting functionality.

Referring to FIG. 3B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 3A.

Figure 4:
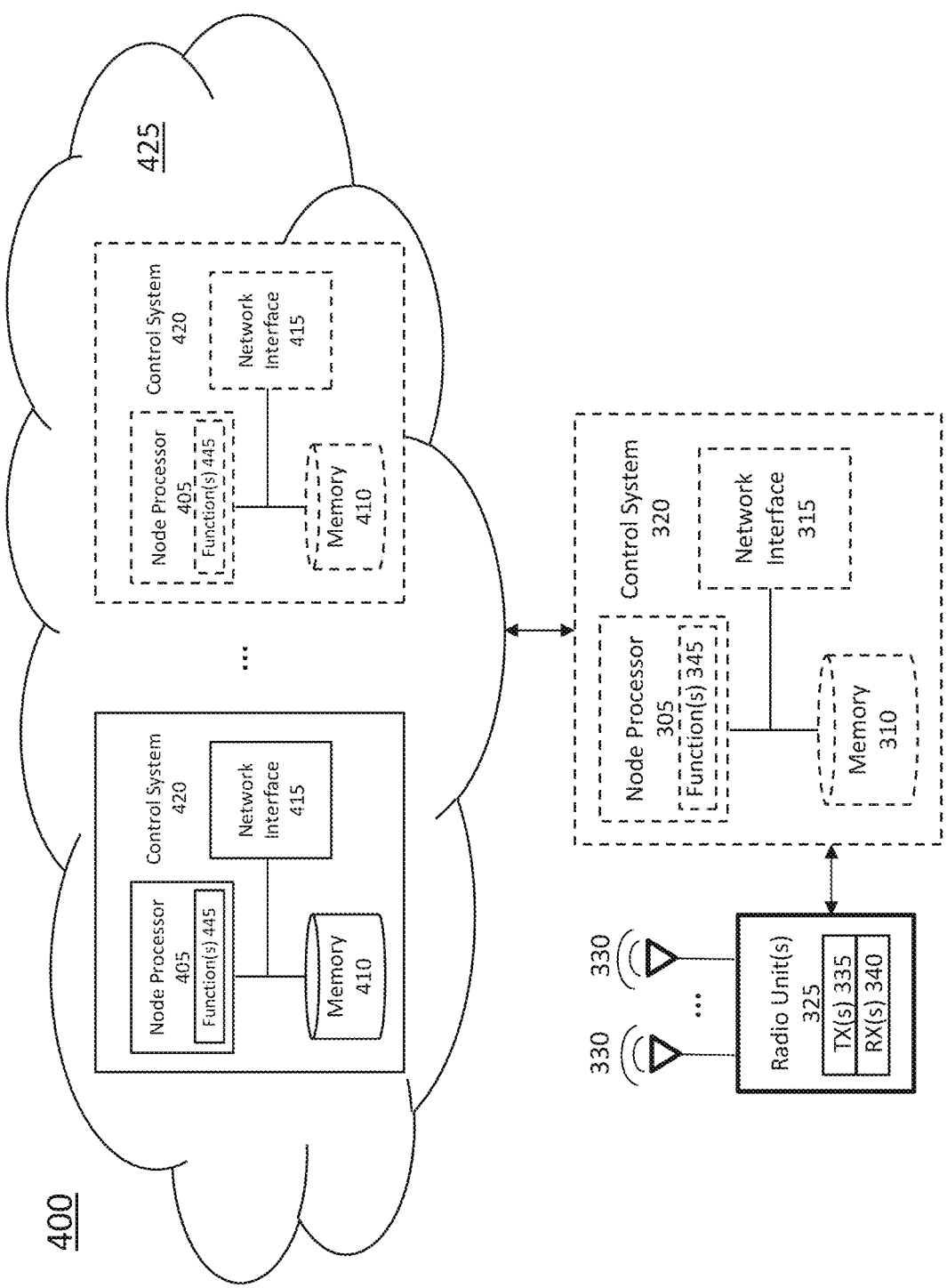
FIG. 4 illustrates a radio access node according to yet another embodiment of the disclosed subject matter.

FIG. 4 is a block diagram that illustrates a virtualized radio access node 400 according to an embodiment of the disclosed subject matter. The concepts described in relation to FIG. 4 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 4, radio access node 400 comprises control system 320 as described in relation to FIG. 3A.

Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface (s).

In some embodiments, a computer program comprises instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein. Embodiments further include a carrier containing any of these computer programs. This carrier may comprise one of an electronic signal, optical signal, radio signal, or computer readable storage medium.

Figure 11:
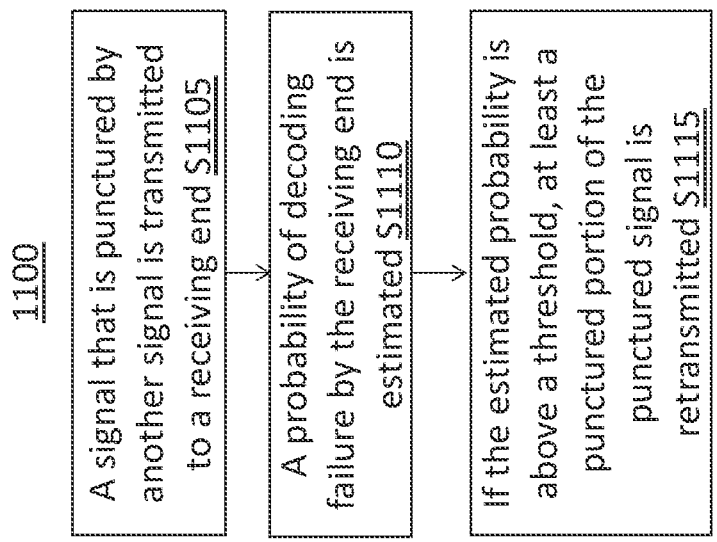
FIG. 11 is a flow chart that illustrates the operation of a wireless device or radio access node that transmits punctured signals according to certain embodiments of the present disclosure.

FIG. 11 is a flowchart illustrating a method of operating radio node, which may be a network node (e.g., radio access node 110) or a wireless device (e.g., wireless communication device 105), to transmit punctured signals in a wireless communications system. The method 1100 comprises a step S1105 in which a signal that is punctured by another signal is transmitted to a receiving end (e.g., a wireless device or a network node, as the case may be). The method 1100 further comprises a step S1110 in which a probability of decoding failure by the receiving end is estimated. The method 1100 further comprises step S1115, in which if the estimated probability is above a threshold, at least a punctured portion of the punctured signal is retransmitted. According to one embodiment of method 1100, the at least a portion of the punctured signal is retransmitted before a NACK is received for the punctured signal from the receiving end. Moreover, or alternatively, the punctured signal may be an eMBB signal and the another signal may be a URLLC signal. The method may include additional steps not shown, may omit certain steps, and/or the order of the steps may differ from that shown. For example, in certain embodiments, the probability estimation step, S1110, may be carried out before the initial transmission step, S1105. In addition, a step of puncturing the punctured signal by another signal is not shown but may be considered as a preliminary step of the method.

Figure 12:
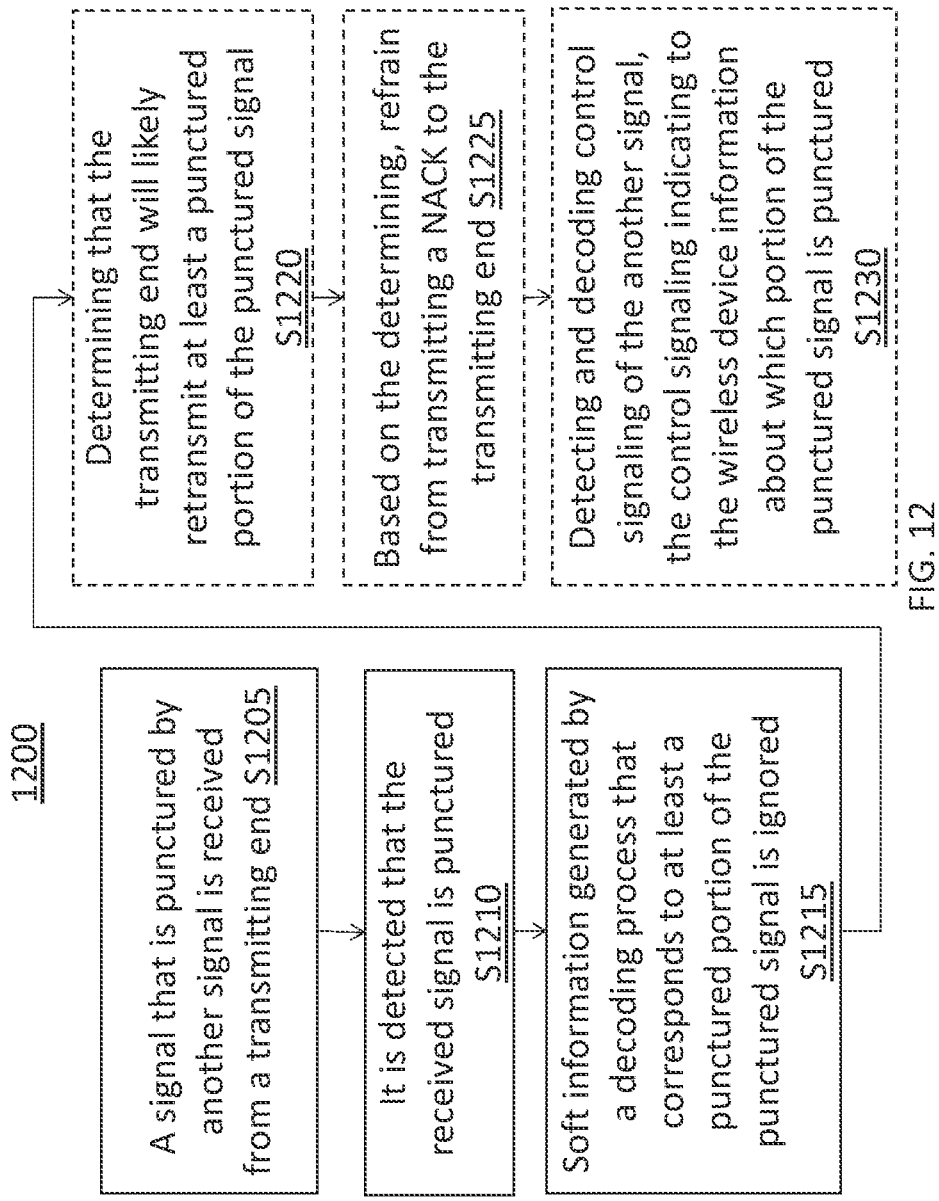
FIG. 12 is a flow chart that illustrates the operation of a wireless device or radio access node that receives punctured signals according to certain embodiments of the present disclosure.

FIG. 12 is another flowchart illustrating a method of operating a network node (e.g., radio access node 110) or a wireless device (e.g., wireless communication device 105) to receive punctured signals in a wireless communications system. The method 1200 comprises a step S1205 in which a signal that is punctured by another signal is received from a transmitting end (e.g., a wireless device or a network node, as the case may be). The method 1200 further comprises a step S1210 in which it is detected that the received signal is punctured. The method 1200 further comprises step S1215, in which soft information generated by a decoding process that corresponds to at least a punctured portion of the punctured signal is ignored. The method may include additional steps not shown, may omit certain steps, and/or the order of the steps may differ from that shown. For example, according to one embodiment, the method further comprises the network node or wireless device determining that the transmitting end will likely retransmit at least a punctured portion of the punctured signal (S1220) and, based on the determining, refrain from transmitting a NACK to the transmitting end (S1225). In addition, or alternatively, the method may include detecting and decoding control signaling of the another signal, the control signaling indicating to the wireless device information about which portion of the punctured signal is punctured (S1230). The information may then be used to determine which soft information is to be ignored in the decoding process. Ignoring the soft information may include setting LLR values corresponding to the ignored soft information to zero.

Figure 13:
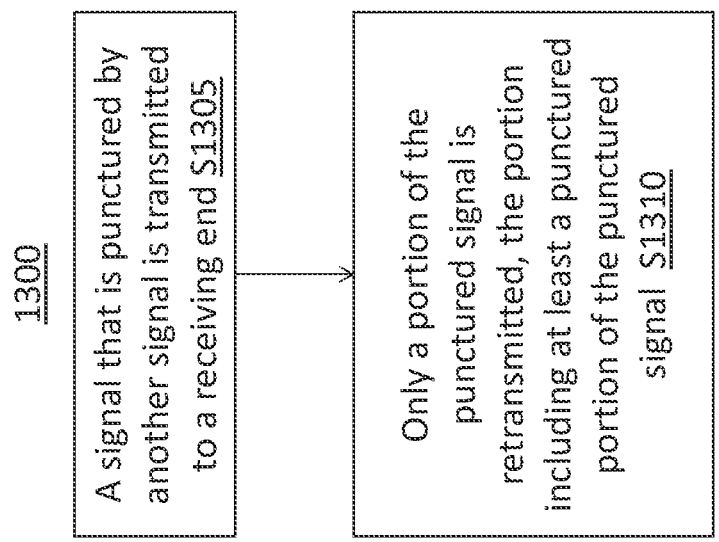
FIG. 13 is a flow chart that illustrates the operation of a wireless device or radio access node that transmits punctured signals according to certain embodiments of the present disclosure.

Either or both of the methods 1100 and 1200 may include additional steps not shown, may omit certain steps, and/or the order of the steps may differ from that shown. For example, FIG. 13 depicts a method 1300 in which the step of estimating a probability of decoding failure, i.e., step S1110, is omitted. In particular, method 1300 includes a step S1305 in which a signal that is punctured by another signal is transmitted to a receiving end. The method 1300 further comprises a step S1310, in which only a portion of the punctured signal is retransmitted, the portion including at least a punctured portion of the punctured signal. According to one embodiment of method 1300, the at least a portion of the punctured signal is retransmitted before a NACK is received for the punctured signal from the receiving end. Moreover, or alternatively, the punctured signal may be an eMBB signal and the another signal may be a URLLC signal. In one embodiment, the portion of the punctured signal comprises one or more segments of a transport block. In addition, the portion of the one or more segments of the transport block may include a code block group.

While the disclosed subject matter has been presented above with reference to various embodiments, it will be understood that various changes in form and details may be made to the described embodiments without departing from the overall scope of the disclosed subject matter.

The invention claimed is:

1. A method for a radio node to transmit punctured signals in a wireless communications system, the method comprising:
  transmitting a signal that is punctured by another signal to another radio node;
  estimating a probability of decoding failure that characterizes a likelihood that the another radio will fail in an attempt to decode the punctured signal based on a function of decoding factors by determining the probability of decoding failure using a look up table indexed according to the decoding factors, the decoding factors including:
    a fraction of punctured bits in the punctured signal;
    a code block length of the punctured signal;
    a code rate of the punctured signal;
    a modulation coding scheme used to the modulate and encode the punctured signal;
    a signal-to-noise ratio (SNR) measured on a channel between the radio node and the another radio node; and
  if the estimated probability is above a threshold, retransmitting at least a punctured portion of the punctured signal.

2. The method of claim 1, wherein the at least a portion of the punctured signal is retransmitted before a NACK is received for the punctured signal from the another radio node.

3. The method of claim 1, wherein the punctured signal is an enhanced Mobile Broadband (eMBB) signal and the another signal is an Ultra Reliable Low-Latency Communication (URLLC) signal.

4. The method of claim 1, wherein the at least a portion of the punctured signal is retransmitted using pre-scheduled uplink resources.

5. The method of claim 1, wherein the at least a portion of the punctured signal is retransmitted using uplink resources indicated by a retransmission scheduling grant.

6. The method of claim 4, wherein the uplink resources allow retransmission of only the punctured portion of the punctured signal.

7. The method of claim 1 wherein the radio node is a wireless device and the another radio node is a radio access node.

8. The method of claim 1 wherein the radio node is a radio access node and the another radio node is a wireless device.

9. A wireless device for a wireless communications system comprising:
   at least one transceiver;
   at least one processor operably coupled to the at least one transceiver; and
   memory comprising instructions executable by the at least one processor;
   the wireless device being operable to perform a method comprising:
      transmitting a signal that is punctured by another signal to another radio node;
      estimating a probability of decoding failure that characterizes a likelihood that the another radio will fail in an attempt to decode the punctured signal based on a function of decoding factors by determining the probability of decoding failure using a look up table indexed according to the decoding factors, the decoding factors including:
         a fraction of punctured bits in the punctured signal;
         a code block length of the punctured signal;
         a code rate of the punctured signal;
         a modulation coding scheme used to the modulate and encode the punctured signal;
         a signal-to-noise ratio (SNR) measured on a channel between the radio node and the another radio node; and
      if the estimated probability is above a threshold, retransmitting at least a punctured portion of the punctured signal.

10. The wireless device of claim 9, wherein the at least a portion of the punctured signal is retransmitted using pre-scheduled uplink resources.

11. The wireless device of claim 9, wherein the at least a portion of the punctured signal is retransmitted using uplink resources indicated by a retransmission scheduling grant.

* * * * *